April 21, 1925.

L. W. EGGLESTON

DAMPER REGULATOR

Filed Feb. 4, 1921

Inventor
LEWIS W. EGGLESTON
by Gifford Bull
his Attorneys

April 21, 1925.
L. W. EGGLESTON
DAMPER REGULATOR
Filed Feb. 4, 1921
1,534,775
2 Sheets-Sheet 2
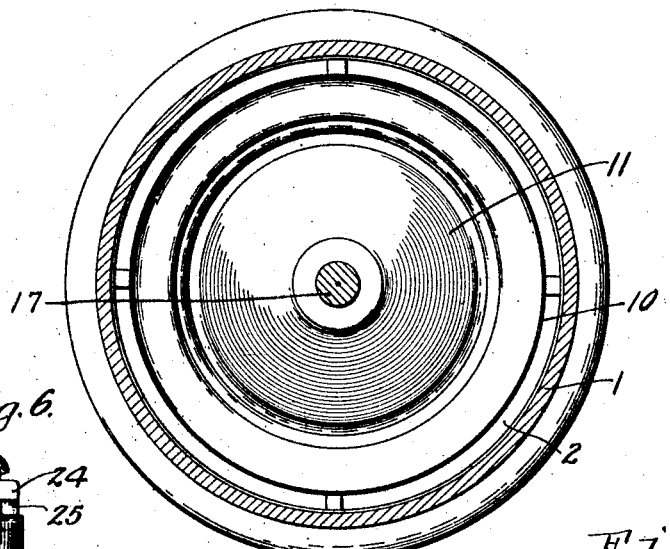
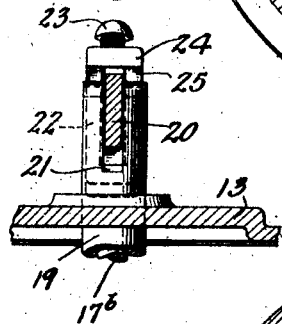
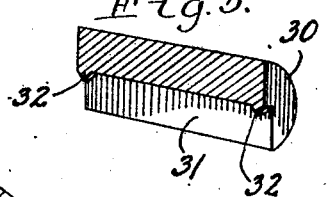
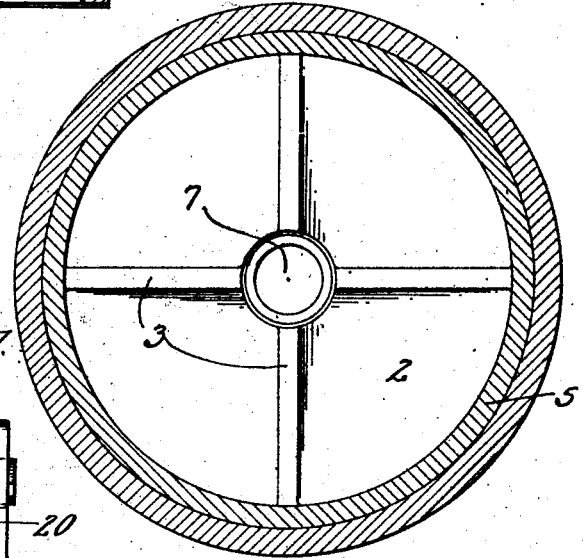
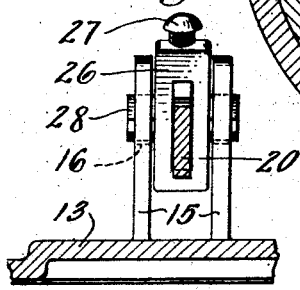
Inventor
LEWIS W. EGGLESTON
by Gifford & Bull
his Attorneys Patented Apr. 21, 1925.

1,534,775

UNITED STATES PATENT OFFICE.

LEWIS W. EGGLESTON, OF BUFFALO, NEW YORK, ASSIGNOR TO AMERICAN RADIATOR COMPANY, OF CHICAGO, ILLINOIS, A CORPORATION OF NEW JERSEY.

DAMPER REGULATOR.

Application filed February 4, 1921. Serial No. 442,535.

*To all whom it may concern:*

Be it known that I, LEWIS W. EGGLESTON, a citizen of the United States, residing at Buffalo, in the county of Erie and State of New York, have invented new and useful Improvements in Damper Regulators, of which the following is a full, clear, concise, and exact description, reference being had to the accompanying drawing, forming a part of this specification.

My invention relates to regulators and is particularly adaptable for use as a regulator for controlling dampers of steam boilers and the like, the invention consisting in the improvements to be more fully described hereinafter, and the novelty of which will be particularly pointed out and distinctly claimed.

For the purpose of disclosing my invention I have illustrated one embodiment thereof in the accompanying drawings, in which—

Fig. 3 is a sectional view taken on the line 3—3 of Fig. 2;

Fig. 4 is a sectional view taken on the line 4—4 of Fig. 2;

Fig. 5 is a sectional view of a balancing weight;

Fig. 6 is a sectional view taken on the line 6—6 of Fig. 2 looking in the direction of the arrows; and Fig. 7 is a sectional view taken on the line 7—7 of Fig. 2 looking in the direction of the arrows.

Figure 1:
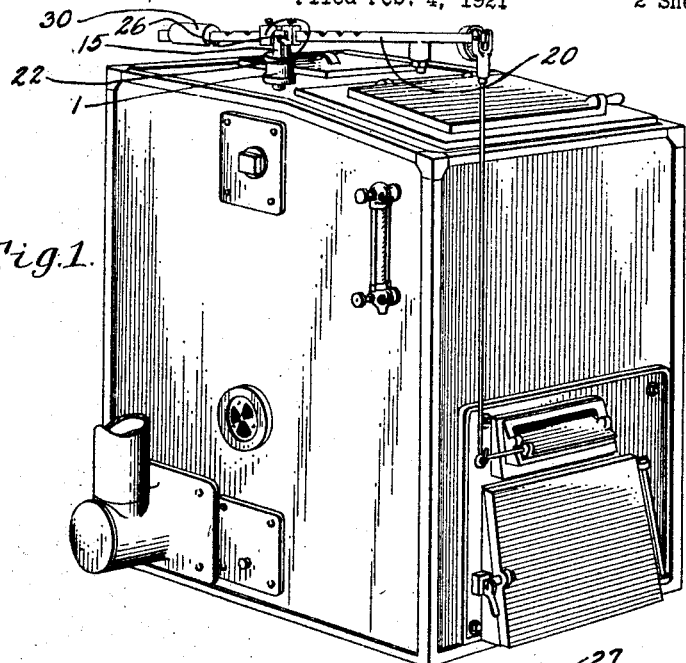
Figure 1 is a perspective view of a steam boiler showing one application of my invention.
Figure 2:
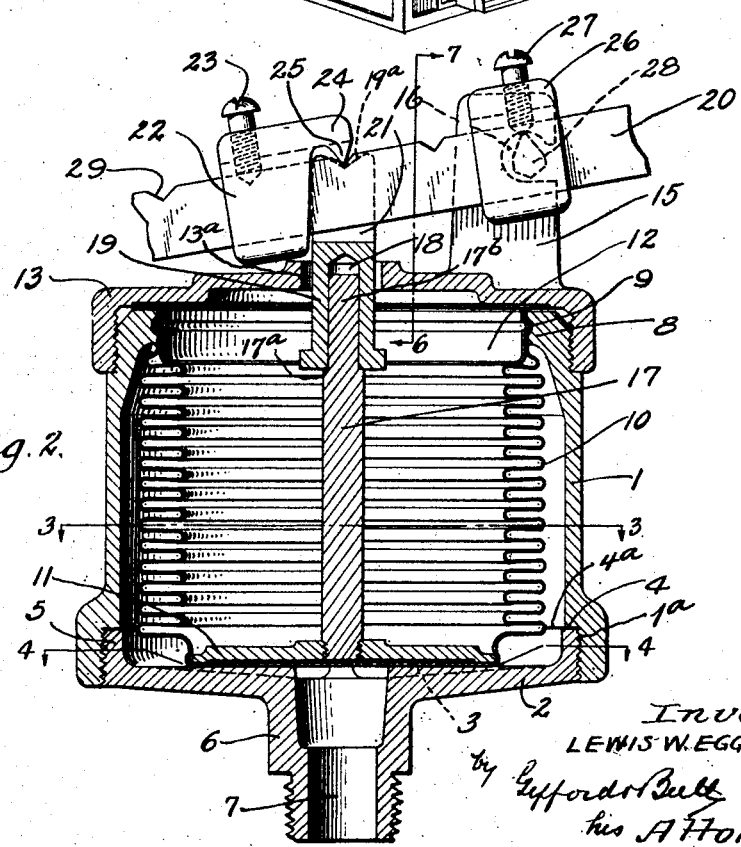
Fig. 2 is a longitudinal sectional view of one embodiment of my invention.

In the preferred embodiment of the invention illustrated, I provide a cylindrical casing 1 having a bottom 2 screw-threaded into the casing and having internal radial flanges 3. In order to obtain a tight joint between the bottom 2 and the casing, the latter is internally screw-threaded, as at $2^a$, and has an annular shoulder 4 formed therein. The bottom 2 is provided with an annular upwardly extending flange 5 and is externally screw-threaded so that as the bottom is screwed into the casing the annular flange will seat on the shoulder 4 and by providing a gasket $4^a$ between these parts a steam tight joint is made at this point. This bottom closure 2 is provided with an extension neck 6 exteriorly screw-threaded to permit attachment of the regulator in position and has an admission port 7 therein for admitting pressure into the casing.

Near the top of the casing there is provided an interior annular flange 8 having formed in the face thereof an annular groove or recess 9. Arranged within the casing is an expansible-collapsible member 10 having its cylindrical wall corrugated and its bottom closed. Fitted within the bottom of the member 10 is a reinforcing disc 11 which is secured in the bottom by corrugating the side wall of the member over the rounded edges of the disc. The wall of the open end of the member 10, together with the wall of an internal reinforcing ring 12, are expanded into the annular recess 9, whereby a steam tight joint is made and an expansion chamber formed between the expansible-collapsible member 10 and the inner wall of the casing 1.

The casing is provided with a top cover 13 having a central opening $13^a$ and this top cover has extending above the same a pair of spaced arms 15 each of which is provided with an opening 16 the inner portion of which is preferably circular in form and which arms constitute a fulcrum support to be further described hereinafter.

Arranged within the expansible-collapsible member and having a screw-threaded connection to the disc 11 is an operating stem 17 the upper end of which is reduced, as at $17^b$, and fits within a socket 18 formed in an extension 19 of this stem to permit ready assemblage of the parts and permit the extension to be rotated. The upper end of this extension 19 is bifurcated and the top edges of the bifurcations have V-shaped recesses $19^a$. The member 17 is provided with a shoulder $17^a$ adapted to engage the extension 19 whereby motion or thrust may be transmitted from said stem 17 to said extension.

For operating a boiler damper or other device, I provide a rocking lever 20 which is arranged between the bifurcated arms 21 of the stem extension 19 and between the spaced apart arms 15 of the fulcrum support. In the embodiment shown, this lever 20 consists of a bar which is oblong in cross-section, and which is arranged with the longer axis of its cross-section extending in a substantially vertical plane. (See Figs. 6 and 7.) This lever is provided with a supporting member preferably in the form of a saddle 22 slotted to fit over the lever and provided with a set screw 23 for locking the same in position thereon. This saddle has a longitudinally extending arm 24, preferably lying over the lever 20 and which is provided with a downwardly directed knife edge 25 adapted to engage in the V shaped recesses 19ª in the top of the stem extension 19. A second supporting member, preferably in the form of a slotted saddle 26 adjustably fits on the lever 20 being held in its position by means of a screw 27. This saddle 26 is provided with a pair of laterally extending pins 28 the upper portions of which are knife edged and extend within the openings 16 on the arms 15 and fulcrum on the upper walls of the circular openings 16.

By this arrangement it will be seen that the supporting or bearing point of the rocking lever is above the center of gravity of the lever. In other words, the fulcrum point and the bearing point of the lever are near the top edge of the lever and the lever is therefore, underslung so that there will be no tendency on the part of the lever to tilt laterally and bind against the arms 15 or 21. Friction is thereby reduced to the minimum and as a result very little power is required to move the lever.

It will also be noted that the expansible-collapsible member 10 is responsive to the pressure applied to the exterior wall of the member. Due to this the stem connection may be made within the expansible-collapsible member and with the closed lower end whereby a long stem may be provided and any tendency of the expansible-collapsible member to tilt to one side or the other prevented. The expansible-collapsible member in its operation and when stationary, remains in a substantially vertical position with all of its corrugations equidistant so that the strain on the metal of the corrugations is equal at all points.

The rocking lever is notched as at 29 on the upper edge not only for the purpose of receiving the screws 27 and 23 of the fulcrum and bearing members but also to position the balancing weight 30. This weight, it will be noted, is provided with an elongated slot 31 and within the slot are a pair of spaced apart knife edges 32 adapted to engage in the notches 29 formed in the upper edge of the lever. This weight may be adjusted back and forth on the lever to correctly balance the apparatus and in practice the notches in the upper edge of the lever are preferably spaced apart on one inch centers. The knife edges 32 are spaced apart three and one-half inches so that only one knife edge will rest in a notch 29 at a time. In the device illustrated with the notches 29 one inch apart and the knife edges 32 on the weight three and one-half inches apart it is obvious that a one-half inch adjustment of the weight on the lever may be obtained. The weight may be moved back until the forward knife edge engages one of the notches which will leave the rear knife edge disengaged. If it is desired to move the weight further it may be moved back until the rear knife edge engages a notch in the lever with the front knife edge free. A half inch adjustment is thus obtained.

While I have shown in the accompanying drawings and described one embodiment of my invention, it is obvious that the invention may take various embodiments and the structure shown and described modified without departing from the spirit of the invention as set forth in the accompanying claims:

1. In a regulator, the combination of an operating lever, a pressure operated member subjected to fluctuations in pressure for operating said lever, a stem extending from said pressure member and having bifurcated arms at its top and arranged on either side of said lever, a slotted saddle adjustably mounted on said lever and having on its top a longitudinally extending arm located above said lever, a knife edge bearing connection between said arm and bifurcated end of the stem, and a fulcrum support for said lever.

2. In a regulator, the combination of an operating lever, a pressure operated member subjected to fluctuations in pressure for operating said lever, a stem extending from said member and having its upper end bifurcated, said bifurcations having V shaped recesses at their upper edges and located on opposite sides of the said lever, a slotted saddle adjustably mounted on said lever and having a longitudinally extending arm located above said lever and provided on its under face with a knife edge seated in said V shaped recesses, and a stationary fulcrum for said lever.

3. In a regulator, the combination of an operating lever, a pressure member subjected to fluctuations in pressure for operating said lever, a pair of spaced arms having openings therein the top of which openings are arcuate, a slotted saddle adjustably mounted on said lever and having laterally extending pins provided on their upper sides with knife edges arranged to engage the walls of said arcuate openings, the engaging point being above the center of gravity of said lever, and a bearing connection between said lever and said pressure operated member.

4. In a regulator, the combination of an operating lever, a pressure operated member subjected to fluctuating pressure for operating said lever, a pair of spaced arms having openings therein the top walls of which are arcuate, a slotted saddle adjustably mounted on said lever and having laterally extending pins knife-edged at their tops and arranged to fulcrum on said arcuate walls, the fulcrum point being above the center of gravity of the lever, a stem extending from said pressure member and having at its upper end a pair of arms extending on opposite sides of the lever, the top edges of said arms having V shaped recesses therein, and a slotted saddle adjustably mounted on said lever and having a longitudinally extending arm arranged above the top of said lever and provided with a knife edge on its under side engaging in said V-shaped recesses.

5. In a regulator, the combination of an operating lever, a pressure-operated member, an operating stem operable by said member, a saddle adjustably mounted on said lever to one side of said stem and having a part located above said lever and projecting over said stem, said part having a pivotal connection with said stem at a point substantially coincident with the upper edge of said lever, and a fulcrum for said lever.

6. In a regulator, the combination of an operating lever, a pressure-operated member, an operating stem operable by said member, a saddle adjustably mounted on said lever to one side of said stem and having a part located above said lever and projecting over said stem, said part having a downwardly directed knife-edge pivotally engaging said stem, and a fulcrum for said lever.

7. In a regulator, the combination of a pressure operated member subjected to fluctuation in pressure, a lever operated by said member and having a plurality of equally spaced notches in its upper edge, a balancing weight for said lever having a pair of projections adapted to engage in said notches, the spacing of said projection being such that only one projection will engage in a notch at a time.

8. In a regulator, the combination of a pressure operated member subjected to fluctuations in pressure, a lever operated thereby and having a plurality of equally spaced notches in its upper edge, and a weight for balancing said lever having a pair of spaced projections adapted to engage in said notches, the distance between said projections being unequal with respect to the distance between said notches.

In witness whereof, I have hereunto subscribed my name in the presence of two witnesses.

LEWIS W. EGGLESTON.

Witnesses:
F. MELSON,
P. E. STOKES.